United States Patent [19]

Fukudome et al.

[11] Patent Number: 5,734,521
[45] Date of Patent: Mar. 31, 1998

[54] MOISTURE-ABSORBENT ELEMENT FOR DISK DRIVES

[75] Inventors: Yoshihito Fukudome, Zama; Yoshinao Harada, Chigasaki; Hiroaki Ando, Kanagawa-ken, all of Japan

[73] Assignee: International Business Machines Corporation, Armonk, N.Y.

[21] Appl. No.: 504,133

[22] Filed: Jul. 19, 1995

[30] Foreign Application Priority Data

Jul. 29, 1994 [JP] Japan .................................. 6-178372

[51] Int. Cl.⁶ .................... G11B 33/14; B01D 53/04
[52] U.S. Cl. .................... 360/97.03; 55/385.6; 55/527
[58] Field of Search .................... 360/97.01–98.01, 360/137; 55/385.1, 385.6, 525, 527

[56] References Cited

U.S. PATENT DOCUMENTS

| | | | |
|---|---|---|---|
| 4,725,411 | 2/1988 | Cornelison | 55/527 |
| 4,831,475 | 5/1989 | Kakuda et al. | 360/97.03 |
| 4,967,295 | 10/1990 | Yamauchi et al. | 360/97.02 |
| 5,012,360 | 4/1991 | Yamauchi et al. | 360/97.02 |
| 5,075,807 | 12/1991 | Inoue et al. | 360/97.02 |
| 5,097,978 | 3/1992 | Eckerd | 360/97.02 |
| 5,098,454 | 3/1992 | Carpentier et al. | 55/527 |
| 5,130,018 | 7/1992 | Tolman et al. | 210/172 |
| 5,189,581 | 2/1993 | Schroder et al. | 360/128 |
| 5,204,068 | 4/1993 | O'Loughlin et al. | 55/527 |
| 5,266,279 | 11/1993 | Haerle | 55/525 |
| 5,293,286 | 3/1994 | Hasegawa et al. | 360/97.02 |
| 5,346,518 | 9/1994 | Baseman et al. | 55/385.1 |
| 5,392,177 | 2/1995 | Chainer et al. | 360/97.02 |
| 5,395,600 | 3/1995 | Cornelison | 55/525 |
| 5,403,387 | 4/1995 | Flynn et al. | 96/143 |
| 5,478,379 | 12/1995 | Bevins | 96/119 |
| 5,505,757 | 4/1996 | Ishii | 55/527 |
| 5,515,214 | 5/1996 | Kiyonaga et al. | 360/97.02 |

FOREIGN PATENT DOCUMENTS

| | | | |
|---|---|---|---|
| 62-88194 | 4/1987 | Japan | 360/97.03 |
| 2-148492 | 6/1990 | Japan | 360/97.02 |
| 2-267793 | 11/1990 | Japan | 360/97.02 |
| 912220 | 3/1982 | Russian Federation | 55/525 |

OTHER PUBLICATIONS

"E–Pack Reticulated Entrainment Packing"; Beco Engineering Company, Mar. 1975.

Primary Examiner—Jefferson Evans
Attorney, Agent, or Firm—Merchant, Gould, Smith, Edell, Welter & Schmidt, P.A.

[57] ABSTRACT

A disk drive having a moisture-absorbent element of compactly folded cloth formed by weaving stainless steel fibers for suppressing the humidity rise in the case accompanying a temperature fall. A disk is housed in an upward open box-shaped case. A magnetic head for writing and reading information on the disk is supported by a head drive. On the top of the case, a cover is fixed by a plurality of screws to nearly seal the interior of the drive. Between the case and the cover is disposed a moisture-absorbent element of compactly folded cloth formed by weaving stainless steel fibers. Held between the bottom of the case and the lower surface of the cover, the moisture-absorbent element is fixed in the drive.

26 Claims, 2 Drawing Sheets

MOISTURE-ABSORBENT ELEMENT FOR DISK DRIVES

BACKGROUND OF THE INVENTION

1. Field of the Invention

This invention relates in general to a disk drive apparatus, and more particularly, to a disk drive apparatus having a moisture-absorbent element made of metal fiber incorporated in the case of the disk drive for suppressing a rise in humidity inside the case accompanying a decrease in temperature in the external environment.

2. Description of Related Art

Unlike the large-scale Hard Disk Drives (HDDs), usually found installed in computer rooms, small-scale HDDs such as a 2.5- or 3.5-inch HDD is generally for a personal-computer use and is required to cope with a wide range of temperatures, humidity, and other natural conditions. In relation to such an HDD apparatus, the effects which must be taken into consideration include high humidity. An increase in humidity may cause moisture to form on the head and disk or may affect the acceleration of metal corrosion. As a result of such considerations, fear may be aroused as to the possibility that data on the disk may be unable to be correctly read.

Accordingly, for the maintenance of reliability in a small-scale HDD, it becomes very important to maintain the humidity in a HDD at a low level.

The intrusion of moisture into a HDD from outside can be prevented to a certain extent by a sealing material, low in moisture permeability, a respiratory filter high in diffusion resistivity, or some other means. Consequently, even in an environment in which the humidity is high, moisture from outside is inhibited so that it is made difficult for the humidity in a HDD to become high.

Here, the next factor to come into question is what happens when the ambient temperature rapidly decreases. In this case, the relative humidity of air enclosed in the HDD rises. One measure implemented to prevent this rise in humidity is a desiccating agent. These desiccating agents have been incorporated in HDDs for some time to help reduce the moisture in the HDD. However, desiccating agents have disadvantages such as a relatively slow response to an abrupt change in humidity and a short effective life span.

None of the prior attempts at suppressing the rise in humidity in a hard disk drive accompanying a decrease in temperature have been successful.

It can be seen then that there is a need for a disk drive apparatus in which the reliability is improved by suppressing the rise in humidity in a case accompanying a decrease in the temperature.

It can also be seen that there is a need for efficient and immediate suppression of the rise in humidity inside the case of a hard disk drive accompanying a decrease in the external temperature.

It can also be seen that there is a need for a disk drive apparatus having a moisture-absorbent element made of metal fiber incorporated in the case of the disk drive for suppressing a rise in humidity inside the case accompanying a decrease in temperature in the external environment.

SUMMARY OF THE INVENTION

To overcome the limitations in the prior art described above, and to overcome other limitations that will become apparent upon reading and understanding the present specification, the present invention discloses a method and apparatus for suppressing the rise in humidity in a case accompanying a decrease in the temperature.

The present invention solves the above-described problems by providing a moisture-absorbent element made of metal fiber incorporated in the case of a hard disk drive.

A system in accordance with the principles of the present invention comprises a disk drive apparatus having a disk that serves as a recording medium in an almost completely sealed case for containing the disk in it, and a moisture-absorbent element made of metal fiber being incorporated in the case. The moisture-absorbent metal fiber may be a stainless steel fiber. Further, the moisture-absorbent element may be shaped like folded pleats.

The case contains a disk in a state of being almost completely sealed and, furthermore, a moisture-absorbent element made of metal fiber is incorporated in the case. Consequently, if the ambient temperature abruptly decreases, the temperature of the moisture-absorbent element made of woven metal fibers generally having a high thermoconductivity decreases rapidly following the temperature change in the case. Moisture is therefore adsorbed such as in the form of condensation, on the surface of the cool metal fibers which are cooled by contact with the case, thus resulting in moisture absorption within the case.

One aspect of the present invention is that suppression of the rise in humidity inside the case of a hard disk drive accompanying a decrease in the external temperature is efficient and immediate.

Another aspect of the present invention is that a moisture-absorbent element made of metal fiber is incorporated in the case of a disk drive to compensate for a rise in humidity inside the case.

Another aspect of the present invention is that a rise in the humidity in the case accompanying an abrupt temperature fall can be suppressed, thus enhancing the reliability of the disk drive apparatus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a moisture-absorbent element made of metal fiber incorporated in the case of a hard disk drive.

Figure 1:
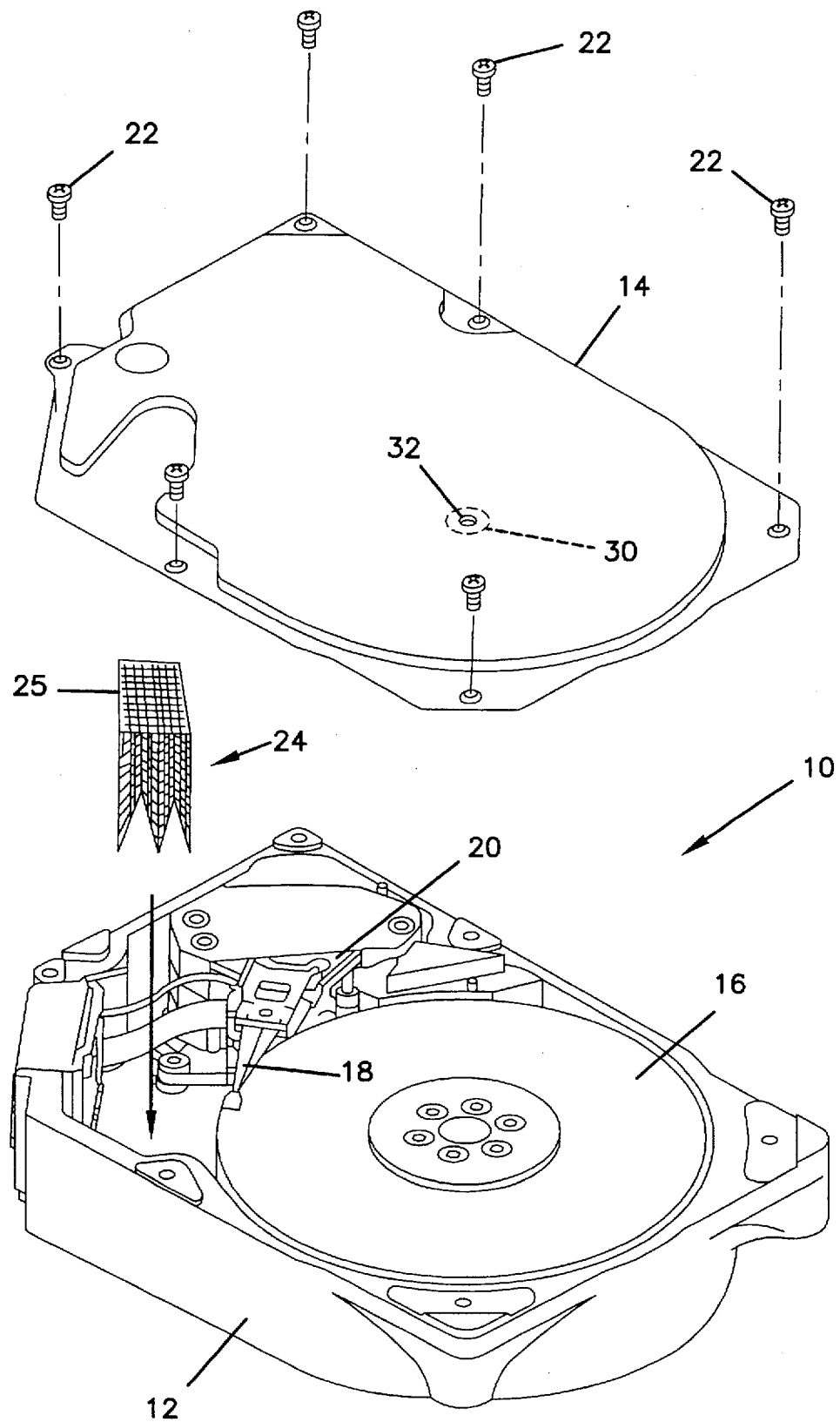
FIG. 1 is an exploded perspective view of one embodiment of a disk drive apparatus according to the present invention.

FIG. 1 illustrates a method and apparatus for suppressing the rise in humidity in a hard disk drive case 10 accompanying a decrease in the temperature according to the invention. According to the invention, a highly thermoconductive and difficult-to-corrode moisture-absorbent element can be obtained because, being made of stainless steel fiber, the metal fiber thus prevents adverse effects due to rust and permits a still higher reliability in the disk drive apparatus.

Thus, according to the invention, a moisture-absorbent element having an increased surface area can be installed in a smaller space or effective volume because of being incorporated into the case in a folded-pleat structure. Thus, since it becomes possible to easily increase the surface area of the moisture-absorbent element, the humidity rise in the case can be suppressed to a still greater degree, thereby permitting a further enhancement in the reliability of the disk drive apparatus.

One embodiment of a disk drive apparatus according to the present invention, applied to a 3.5-inch hard disk drive, will hereinafter be described with reference to FIGS. 1 and 2.

As shown in FIG. 1, four disks 16, for example, rotatable by the driving of a motor (not shown) are housed in the case 12 of an upwardly open box-shaped housing forming the outer frame of a 3.5-inch hard disk drive (hereinafter referred to as a disk) 10. These disks 16 are made into recording media by depositing a magnetic film on the surface of an aluminum substrate. Furthermore, a magnetic head 18 for writing information to and reading it from a disk 16 is supported by a head drive 20 for moving the magnetic head 18 over the surface of the disk 16.

On the top of the case 12, a cover 14 that closes the opened upper surface of the case 12 is fixed by a plurality of screws 22 to nearly seal the interior of the drive 10. However, it is to be understood that the use of screws to fix the cover to the case is not meant to limit the invention. Those skilled in the art will recognize that other methods for attaching the cover to the case may be used without departing from the invention.

The case 12 and the cover 14 are individually made of metal, such as aluminum or aluminum alloy, both of which come to constitute a case in which the disk 16 is housed with the interior almost completely sealed from the outside atmosphere.

Furthermore, between the case 12 and the cover 14 is disposed a moisture-absorbent element 24 of folded cloth 25 formed by weaving stainless steel fibers representative of highly thermoconductive metal fibers. In the upper part of this cloth 25, opposed to and pushed into contact with the cover 14, one folded end of the cloth 25 is arranged. Here, as the cloth 25 constituting the moisture-absorbent element 24, it is assumed to use, for example, a cloth, with fibers 12 μm in diameter and having a density of 1000 g/m².

From these factors, the moisture-absorbent element 24, held between the lower surface of the cover 14 and the bottom of the case 12, come to be fixed in the drive 10.

Incidentally, using such a moisture-absorbent element 24 is for the purpose of obtaining a larger surface area with a smaller volume. That is, when using a cloth with fibers 12 μm in diameter and which have a density of 1000 g/m² as described above, the surface area of fibers per area of 1 cm² in the cloth 25 constituting the moisture-absorbent element 24 may amount to as large as about 4400 mm². This value is equal to about one twentieth of the surface area in the drive 10, a sum of the inside measured area of the case 12 and the cover 14 and the surface area of four disks 16.

Further, on the bottom of this cover 14, a respiratory filter 30 permeable only by air is placed, and ventilates air through a hole 32 drilled in the cover 14 inside and outside the drive 10. However, the arrangement is such that dust and moisture do not intrude into the drive 10 due to a respiratory filter 30.

When the temperature of the atmosphere in the sealed or nearly sealed case abruptly decreases, the relative humidity in the case increases. However, the rate of this rise is smaller than the theoretical rate of humidity rise and varies with different ratios between the volume of the space in the case and the surface area derived from the inner wall surfaces and other surfaces of the case.

Figure 2:
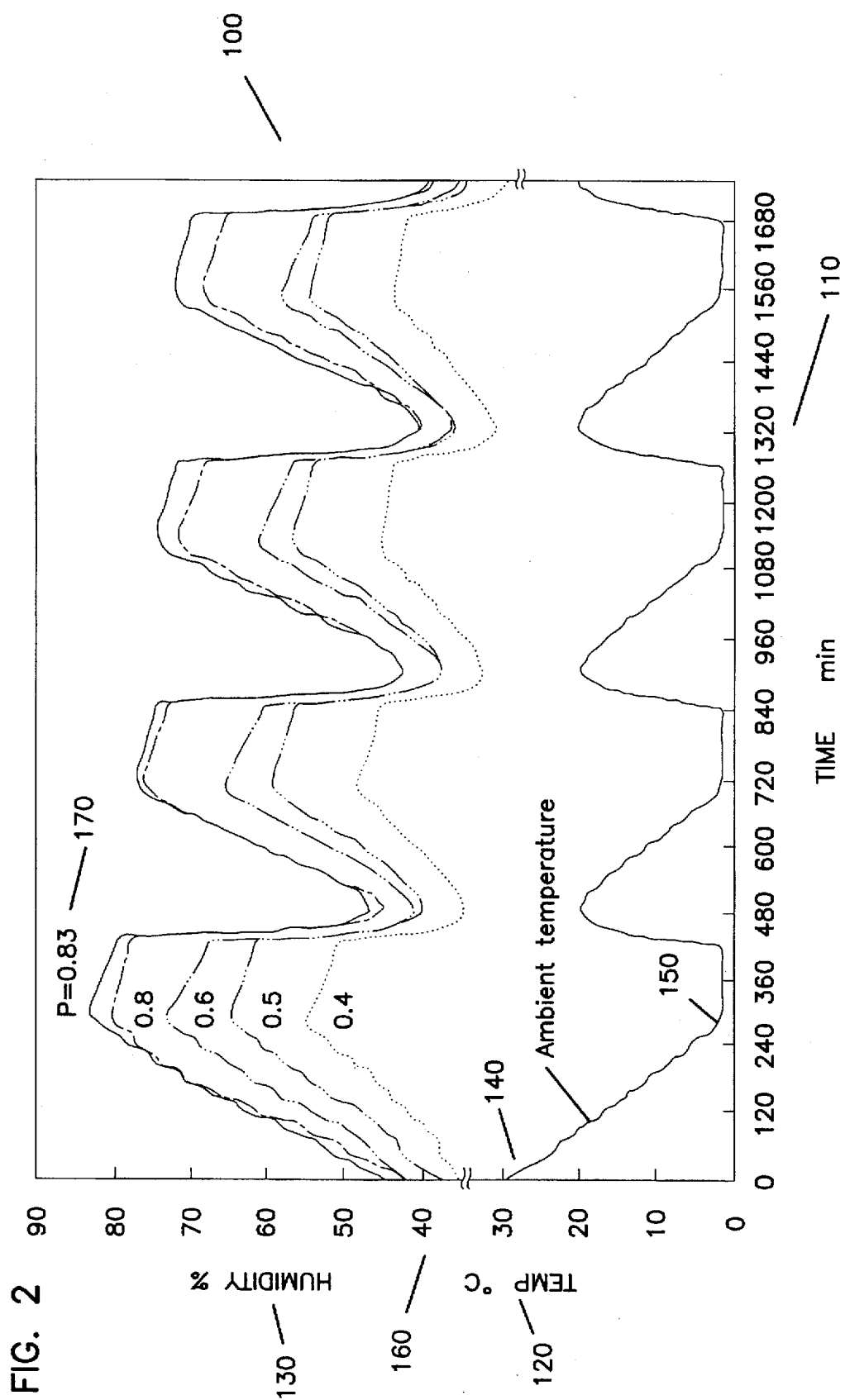
FIG. 2 is a graphical representation illustrating data on changes in humidity accompanying temperature changes that affords a ground for one embodiment of a disk drive apparatus according to the present invention.

FIG. 2 illustrates test data regarding the relationship between the volume to surface area ratio, temperature, and relative humidity. The abscissa of FIG. 2 represents the lapse of time 110 in units of minutes; the lower part of the ordinate, the temperature 120; and the upper part of the ordinate, the relative humidity 130. For example as shown in FIG. 2, when lowering the ambient temperature 120 from about 30° C. 140 down to about 3° C. 150 with the lapse of time 110, the relative humidity 130 rises correspondingly from around 40% 160 for every time that a decrease in temperature 120 occurs.

However, the overall change in the relative humidity is also a function of P 170 which representing the volume (in terms of cm³) per unit surface area of 1 cm². Accordingly, a larger surface of the interior, represented by a lower ratio value for P, increases the amount of absorbed moisture. Thus, increases in the relative humidity can be suppressed since moisture is adsorbed on the inner wall of the case. In a case where the volume of the case is fixed, the greater the inner surface area, the more moisture is adsorbed thereby suppressing a rise in relative humidity.

Referring again to FIG. 1, the action of the drive 10 according to the present embodiment will hereinafter be described. Since the moisture-absorbent element 24 formed by weaving highly thermoconductive stainless steel fibers is incorporated into the drive 10, the temperature of this moisture-absorbent element 24 rapidly follows the change in the temperature of the case 12 and the cover 14, even when the ambient temperature falls abruptly, and the temperature of this moisture-absorbent element 24 falls. Thus, moisture, such as condensation, is adsorbed on the surface of the stainless steel fibers cooled by the case body 12 and the cover 14, and moisture in the drive 10 is absorbed.

As a result, the humidity rise in the drive 10 accompanying an abrupt temperature fall can be suppressed, thereby permitting an enhancement in the reliability of the drive 10.

Herein, employing stainless steel fibers as metal fibers permits a highly thermoconductive (thermoconductivity: about 0.039 cal/cm·sec·°C.) and difficult-to-corrode moisture-absorbent element 24 to be obtained, so that the reliability of the drive 10 can be further enhanced. Employing stainless steel in a fibrous form in such drives 10 eliminates the need for considering the generation of gas or dust from the moisture-absorbent element 24.

Since the moisture-absorbent element 24 is incorporated in a folded pleat structure in the drive 10 as shown in FIG. 1, it becomes possible to install a moisture-absorbent element 24 having a larger surface area in a smaller space. Consequently, an ease in using the moisture-absorbent element 24 having a larger surface can suppress a rise in humidity in the drive 10 still further, thus promoting the reliability of the drive 10.

Incidentally, in the aforementioned embodiment, to improve the heat transfer to the moisture-absorbent element 24 by increasing the contact area with the case 12 and cover 14, the moisture-absorbent element 24, held between the case 12 and the cover 14, is fixed in the drive 10, but may be fastened inside the drive 10 with an adhesive or by welding such as spot welding instead.

The moisture-absorbing element 24 is folded after pleat processing, but, for example, may be adhered to the bottom of the cover 14 and kept in an extending state rather than being folded.

Further, as a material for the moisture-absorbent element 24 to be used in the aforesaid embodiment, stainless steel fiber is employed, where a fiber composed of SUS316L or SUS304 (e.g., "NASCON", the trade mark of Nippon Seisen K.K.) is considered concretely. However, the metal fiber of the present invention is not limited to stainless steel fiber but may be a fiber made of, for example, brass or steel, and the fiber diameter and density also are not limited to those of the embodiment.

A disk drive apparatus according to the present invention, because of being constructed as has been described above, has advantages in that the humidity rise in the case accompanying a temperature fall can be suppressed, permitting an enhancement in reliability.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive apparatus having a disk that serves as a recording medium, comprising:

a substantially sealed case for housing a disk; and a metal fiber disposed within the case solely for reducing humidity within the case by adsorbing moisture that condenses on the metal fiber.

2. A disk drive apparatus according to claim 1, wherein the metal fiber is stainless steel fiber.

3. A disk drive apparatus according to claim 1, wherein the metal fiber is brass fiber.

4. A disk drive apparatus according to claim 1, wherein said metal fiber forms a woven element which is pleated.

5. A disk drive apparatus according to claim 1, wherein the metal fiber is highly thermoconductive.

6. A disk drive apparatus according to claim 1, wherein the metal fiber is adhesively fixed to the case.

7. A disk drive apparatus according to claim 1, wherein the metal fiber is welded to the case.

a metal fiber disposed within the case solely for reducing humidity within the case by adsorbing moisture that condenses on the metal fiber.

8. A disk drive apparatus, comprising:

at least one disk for recording data thereon;

a case for housing the disk, the case further comprising a base and a cover;

a sealant, disposed between the base and the cover of the case, for preventing moisture from intruding into the case; and a metal fiber disposed within the case solely for reducing humidity within the case by adsorbing moisture that condenses on the metal fiber.

9. A disk drive apparatus according to claim 8, wherein the metal fiber forms a woven cloth.

10. A disk drive apparatus according to claim 8, wherein the metal fiber is stainless steel fiber.

11. A disk drive apparatus according to claim 8, wherein the metal fiber is brass fiber.

12. A disk drive apparatus according to claim 8, wherein said metal fiber forms a pleated mesh.

13. A disk drive apparatus according to claim 8, wherein the metal fiber is highly thermoconductive.

14. A disk drive apparatus according to claim 13, wherein the high thermoconductivity of the metal fiber allows the metal fiber to track the temperature of the case such that moisture collects on the metal fiber as the temperature decreases.

15. A disk drive apparatus according to claim 8, wherein the metal fiber is adhesively fixed to the case.

16. A disk drive apparatus according to claim 8, wherein the metal fiber is welded to the case.

17. A disk drive apparatus according to claim 8, wherein the diameter of the metal fiber is 12 μm and the density is 1000 g/m$^2$.

18. A method for suppressing the humidity inside a disk drive case, comprising the steps of:

forming a woven cloth of metal fibers;

placing the woven cloth inside a disk drive case;

sealing the case to prevent moisture from infiltrating the case; and controlling humidity within the case by condensing moisture on the metal fibers in response to a temperature decrease.

19. The method of claim 18, wherein the metal fibers are stainless steel fibers.

20. The method of claim 18, wherein the metal fibers are brass fibers.

21. The method of claim 18, wherein the step of forming a woven cloth of metal fibers further comprises the step of folding the cloth to form folded pleats.

22. The method of claim 18, wherein the woven cloth is highly thermoconductive.

23. The method of claim 22, further comprising the steps of allowing the metal fibers to track the temperature of the case due to the high conductivity and collecting moisture on the metal fibers as the temperature decreases.

24. The method of claim 18, wherein the step of placing the woven cloth inside the disk drive case further comprises the step of adhesively fixing the woven cloth to the case.

25. The method of claim 18, wherein the step of placing the woven cloth inside the disk drive case further comprises the step of welding the woven cloth to the case.

26. The method of claim 18, wherein the diameter of the metal fiber is 12 μm and the density is 1000 g/m$^2$.

* * * * *